(12) United States Patent
Ryu et al.

(10) Patent No.: US 8,434,926 B2
(45) Date of Patent: May 7, 2013

(54) LIGHT SOURCE APPARATUS, METHOD OF MANUFACTURING THE LIGHT SOURCE APPARATUS AND BACKLIGHT ASSEMBLY HAVING THE SAME

(75) Inventors: Ho-Han Ryu, Suwon-si (KR); Tae-Seok Kim, Suwon-si (KR); Jin-Gwan Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 506 days.

(21) Appl. No.: 12/473,148

(22) Filed: May 27, 2009

(65) Prior Publication Data
US 2009/0323371 A1    Dec. 31, 2009

(30) Foreign Application Priority Data
Jun. 27, 2008    (KR) ................. 10-2008-0061522

(51) Int. Cl.
*F21V 7/04* (2006.01)
(52) U.S. Cl.
USPC ............ 362/634; 362/615; 362/632; 362/633
(58) Field of Classification Search .................. 362/615, 362/632–634
See application file for complete search history.

(56) References Cited

U.S. PATENT DOCUMENTS

| | | | | |
|---|---|---|---|---|
| 5,815,227 A * | 9/1998 | Lee | ................. | 349/67 |
| 6,286,971 B1 * | 9/2001 | Hori | ................. | 362/614 |
| 6,966,686 B2 * | 11/2005 | Chen | ................. | 362/634 |
| 7,198,399 B2 * | 4/2007 | Tseng et al. | ................. | 362/609 |
| 7,207,707 B2 * | 4/2007 | Huang et al. | ................. | 362/614 |
| 7,419,293 B2 * | 9/2008 | Yu et al. | ................. | 362/634 |
| 7,458,711 B2 * | 12/2008 | Cheng | ................. | 362/621 |
| 7,494,259 B2 * | 2/2009 | Hayashi et al. | ................. | 362/609 |
| 2006/0092667 A1 * | 5/2006 | Peng | ................. | 362/615 |
| 2007/0127261 A1 * | 6/2007 | An et al. | ................. | 362/608 |
| 2007/0171677 A1 * | 7/2007 | Yano et al. | ................. | 362/614 |
| 2007/0195551 A1 * | 8/2007 | Shin | ................. | 362/612 |
| 2007/0223246 A1 * | 9/2007 | Zhu et al. | ................. | 362/600 |
| 2009/0016079 A1 * | 1/2009 | Mizutani | ................. | 362/617 |

FOREIGN PATENT DOCUMENTS

| | | |
|---|---|---|
| JP | 07-240106 | 9/1995 |
| JP | 09-230341 | 9/1997 |
| KR | 10-2006-0089013 | 8/2006 |

* cited by examiner

*Primary Examiner* — David J Makiya
(74) *Attorney, Agent, or Firm* — Innovation Counsel LLP

(57) ABSTRACT

In a light source apparatus, a method of manufacturing the light source and a backlight assembly having the same, a light guide plate (LGP) includes an upper surface and a lower surface facing each other and a first side surface and a second side surface. The light source is placed in the LGP adjacent to the first side surface and emits light toward the second side surface. The power supply unit is electrically connected to the light source and partially placed in the LGP. The light source may include a lamp or a light-emitting diode (LED). The power supply unit may include a wire or a power supply substrate. The light source apparatus may be formed by an injection molding process using lower and upper mold frames. Therefore, backlight assembly size, the number of parts and manufacturing steps may be decreased, and the illumination quality may be improved.

21 Claims, 14 Drawing Sheets

LIGHT SOURCE APPARATUS, METHOD OF MANUFACTURING THE LIGHT SOURCE APPARATUS AND BACKLIGHT ASSEMBLY HAVING THE SAME

PRIORITY STATEMENT

This application claims priority under 35 U.S.C. §119 to Korean Patent Application No. 2008-61522, filed in the Korean Intellectual Property Office (KIPO) on Jun. 27, 2008, the contents of which are herein incorporated by reference in their entirety.

BACKGROUND OF THE INVENTION

1. Field of the Invention

The present invention relates to a light source apparatus, a method of manufacturing the light source apparatus, and a backlight assembly having the light source apparatus. In particular, the light source apparatus is used in a display apparatus as a backlight source.

2. Description of the Related Art

Generally, a liquid crystal display (LCD) device includes a display panel assembly and a backlight assembly which provides backside illumination. The display panel assembly displays images with the light. The backlight assembly is classified as either an edge illumination type or a direct illumination type.

In the edge illumination type backlight assembly, a lamp is placed on a side surface of a light guide plate (LGP). In the direct illumination type backlight assembly, a plurality of lamps is placed under a display panel. The backlight assembly may include many parts and have a complex structure.

For example, the edge illumination type backlight assembly may include several parts, such as a reflector surrounding the lamp, and a lamp holder which holds the lamp and connects wires. In particular, ground wires among power supply wires are separately assembled with a mold frame after a lamp module is assembled with the mold frame containing the LGP. The number of assembly steps and the size of the module may be increased, and wire insulation may be broken from the tightness. Also, the lamp and connection portion may be damaged during manufacturing.

When light-emitting diodes (LEDs) are placed on a side surface of the LGP, light efficiency may be decreased because distances between the LEDs and the side surface of the LGP may be larger than optimized.

SUMMARY

This section summarizes some features of the invention, but it should not limit all the aspects of the invention disclosed in this application.

The present invention provides a light source apparatus having improved light efficiency and is easy to assemble; a method of manufacturing the light source apparatus; and a backlight assembly.

According to one aspect of the present invention, a light source includes a light guide plate (LGP), a lamp and a power supply unit. The LGP includes an upper surface and a lower surface facing each other, and a first side surface and a second side surface facing each other, the first side surface and the second side surface being connected to the upper surface and the lower surface, respectively, so the four surfaces form a rectangular box. The lamp is placed at the LGP adjacent to the first side surface and emits light toward the second side surface. The power supply unit is electrically connected to the light source and a portion of the power supply unit is placed in the LGP.

In an example embodiment of the present invention, the light source may include a lamp tube, a first electrode and a second electrode. The lamp tube is placed at the LGP to face the first side surface. The first electrode is connected to a first end of the lamp tube. The second electrode is connected to a second end of the lamp tube at the opposite side to the first end.

Another aspect of the invention provides a method of manufacturing a light source apparatus. The method includes a lower mold frame with a forming recess which has a shape like an LGP. A lamp is placed to face one recess surface on the forming recess. The lamp module includes a lamp, and two wires at the two electrodes. Then an upper mold frame is placed on the lower mold frame. Molding resin is injected into the forming recess surrounding the lamp module. A light source apparatus is then separated from the lower and upper mold frames. The light source apparatus includes the LGP which is formed of the molding resin in the forming recess and the lamp module located in the LGP.

The present invention may also includes, forming in the lower mold frame a first fixing bar having a first curved surface surrounding a portion of an outer surface of the lamp; forming in the upper mold frame a second fixing bar having a second curved surface surrounding a portion of an outer surface of the lamp. The lamp may be placed on the first and the second curved surface to face the first recess side surface. Suction holes may be formed through the first curve surface and the lamp may be held on the first curved surface by the suction holes.

Another aspect of the present invention is a backlight assembly that includes a container and a light source apparatus. The container includes a bottom plate and sidewalls extending from the bottom plate. The light source apparatus includes an LGP, a light source and a power supply unit. The LGP includes a lower surface facing the bottom plate and an upper surface facing the lower surface, a first side surface between the lower and upper surfaces and a second side surface facing the first side surface. A light source is placed in the LGP adjacent to the first side surface and emits light toward the second side surface. The power supply unit is electrically connected to the light source and a portion of the power supply unit is placed in the LGP.

The container may further include a light source guide part which extends from the first-side surface-facing sidewall to the upper surface of the light guide. The backlight assembly may further include a reflective sheet, placed in between the bottom plate, the LGP, the sidewall, the first side surface, the light source guide, and the upper surface of the LGP.

The invention will reduce the module size, the number of parts in a backlight assembly, and simplify the steps of manufacturing processes for a light source apparatus and the backlight assembly. As a result, lamination quality of the light source apparatus may be improved and external damage to the light source may be prevented. Thus, the present invention may be used in a backlight assembly including an LGP in a flat panel display apparatus.

BRIEF DESCRIPTION OF THE DRAWINGS

The above and other features and advantages of the present invention will become more apparent by describing in detailed example embodiments thereof with reference to the accompanying drawings.

DETAILED DESCRIPTION

Figure 1:
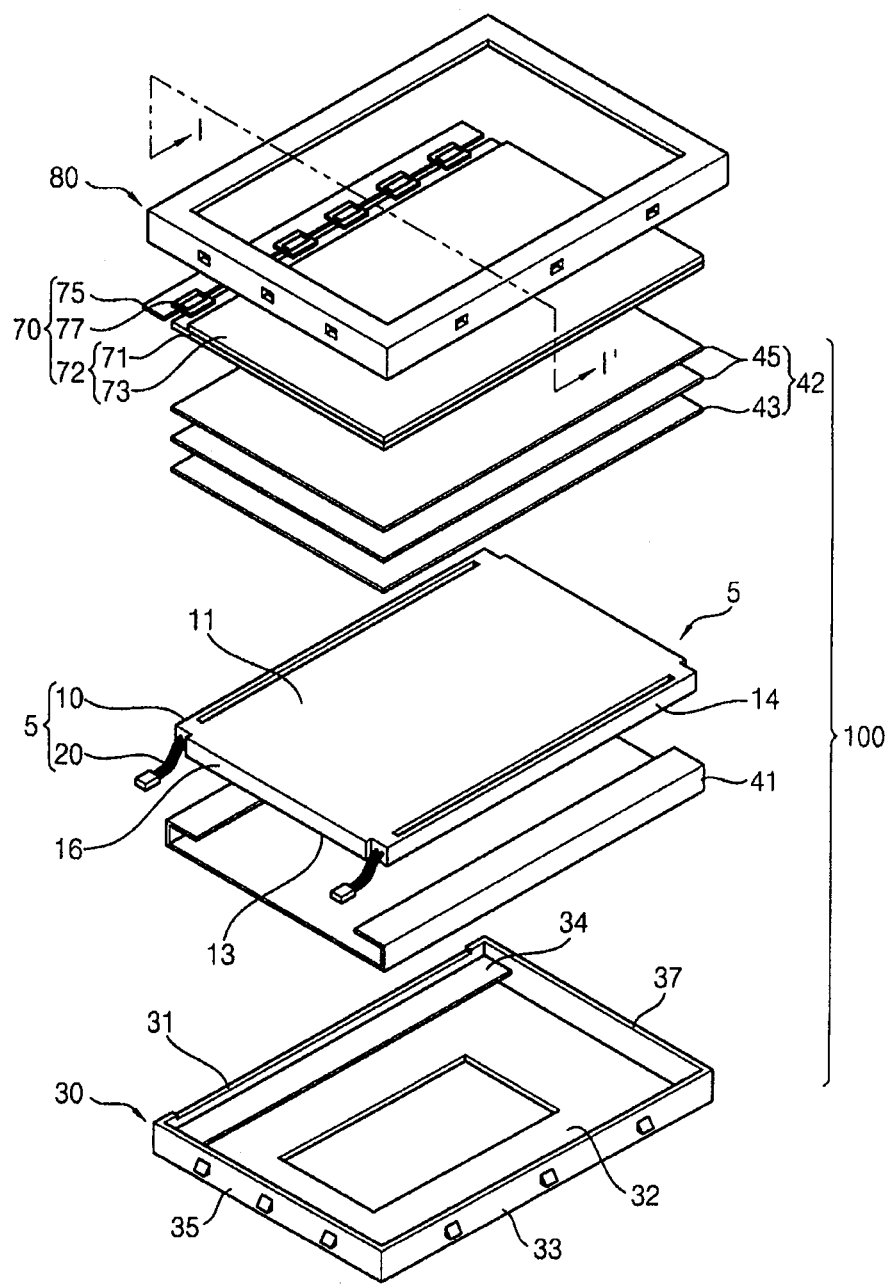
FIG. 1 is an exploded perspective view illustrating a display apparatus including a backlight assembly in accordance with an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, relative sizes of features, layers and regions may be exaggerated for //clarity.

It will be understood that when an element or layer is described as being "on," "connected to" or "coupled to" another element or layer, it can be either directly on, connected or coupled to the other element or layer, or via intervening elements or layers. In contrast, when an element is described as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe and distinguish various elements, components, regions, layers and/or sections, they should not be limited by these terms. Thus, a first element, component, region, layer or section discussed below could be termed a second element, component, region, layer or section in a different reference without departing from the teachings of the present invention.

Spatially relative terms, such as "beneath," "below," "lower," "above," "upper" and the like, may be used herein to describe one element or feature's relationship to another element(s) or feature(s) as illustrated in the figures. It will be understood that the spatially relative terms are intended to encompass different orientations of the device in use in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to limit the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude other features, integers, steps, operations, elements, components, and/or groups thereof.

Example embodiments of the invention are described herein with reference to cross-sectional illustrations that are schematic illustrations of idealized example embodiments (and intermediate structures) of the present invention. Deviation from manufacturing process and tolerance as such is expected. For example, an implanted region illustrated as a rectangle will, typically, have a bevel feature, and there is a gradient of implant concentration at the edges. Likewise, a buried region formed by implantation may have blurred boundaries.

Hereinafter, the present invention will be explained in detail with reference to the accompanying drawings.

FIG. 1 is an exploded perspective view illustrating a display apparatus 3 including a backlight assembly 100 in accordance with an example embodiment of the present invention.

Referring to FIG. 1, a backlight assembly 100 according to an example embodiment is placed on a rear face of a display panel 70 and provides light to a rear face of the display panel 70 so that image can be displayed. The display panel 70 may be a flat panel display such as a liquid crystal display (LCD). The LCD panel 70 displays the image ruminated by the light provided by the backlight assembly 100. The LCD panel 70 may include a lower substrate 71 where pixels are formed, an upper substrate 73 facing the lower substrate 71, a driving substrate 75 providing panel driving signals and a flexible printed circuit film 77 connecting the driving substrate 75 to the lower substrate 71.

The backlight assembly 100 includes a container 30 and a light source apparatus 5. External electrical power is applied to the light source apparatus 5 and the light source apparatus 5 generates light. The container 30 contains the light source apparatus 5 and supports the LCD panel 70 on the light source apparatus 5. The container 30 may include a bottom plate 32 and sidewalls extending from the bottom plate 32. The container 30 may be a plastic-mold and may have a box shape with an upward opening.

The bottom plate 32 has a rectangular shape. An opening is formed on the bottom plate 32 for decreasing the weight of the container 30. Four sidewalls extend from the edges of the bottom plate 32. A first sidewall 31 and a second sidewall 33 face each other and are substantially parallel with a long side of the bottom plate 32. A third sidewall 35 and a fourth sidewall 37 face each other and are substantially parallel with a short side of the bottom plate 32. A guide groove which guides the flexible printed circuit film 77 may be formed on an upper end of the first sidewall 31. Protrusion portions may be formed on outer faces of the sidewalls 31, 33, 35 and 37. The protrusion portions may be used in assembling the container with a top chassis covering LCD panel 70.

The container 30 may further include a light source guide portion 34. The light source guide portion 34 may extend from the first and second sidewalls 31 and 33, respectively, to be substantially parallel with the bottom plate 32. The light source guide portion 34 is spaced apart from the bottom plate 32. Side end portions of the light source apparatus 5 are inserted into a space between the bottom plate 32 and the light source guide portion 34.

Figure 2:
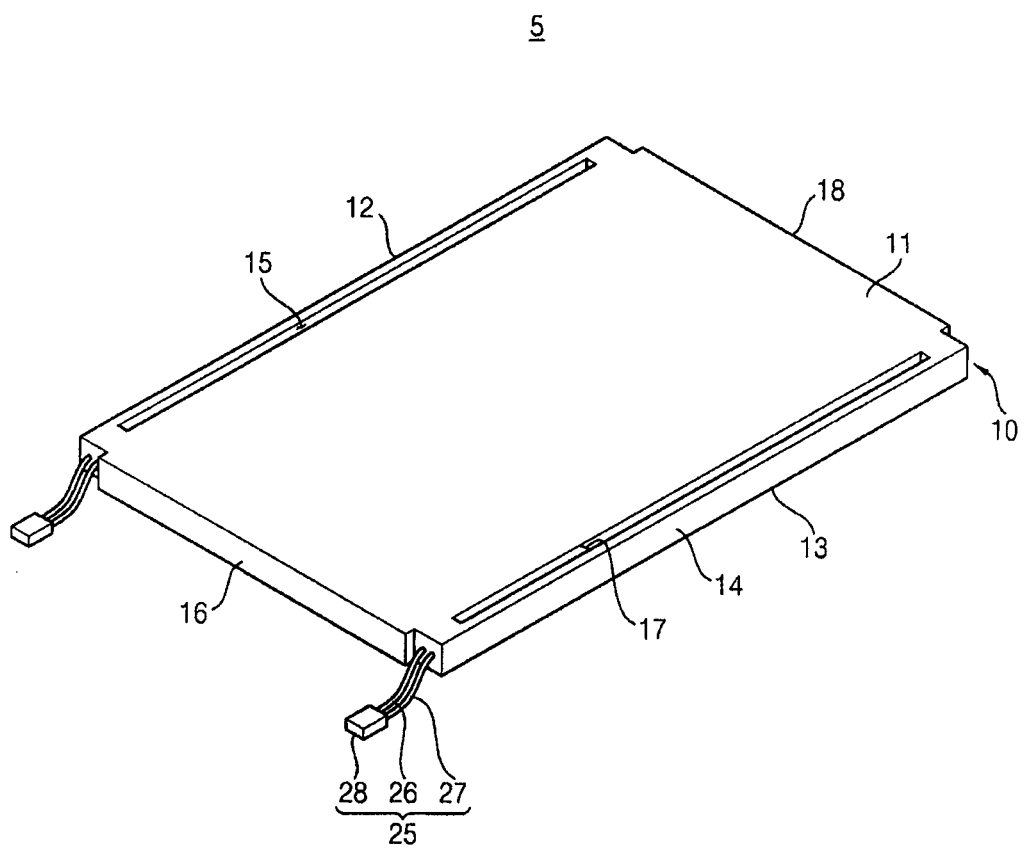
FIG. 2 is a perspective view illustrating a light source apparatus shown in FIG. 1.
Figure 3:
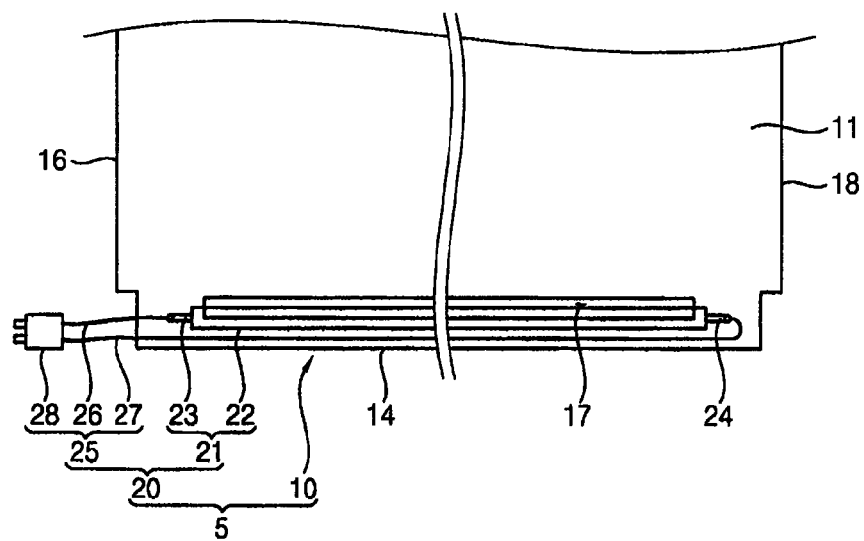
FIG. 3 is a partial plan view illustrating the light source apparatus shown in FIG. 2.
Figure 4:
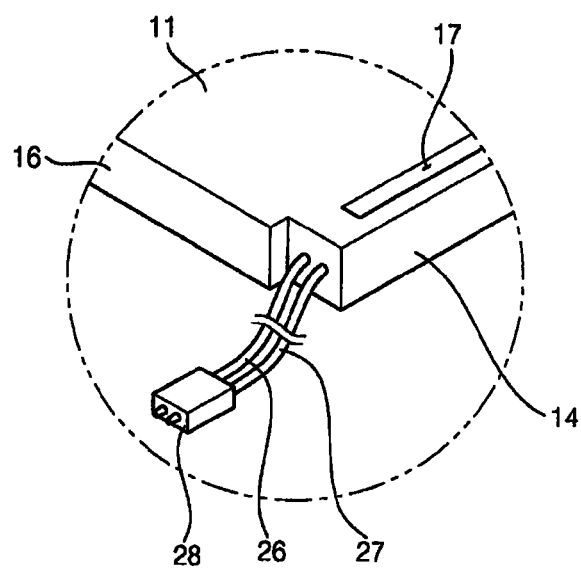
FIG. 4 is a partial perspective view illustrating the light source apparatus shown in FIG. 2 for illustrating drawn-out power wires.

FIG. 2 is a perspective view illustrating a light source apparatus 5 shown in FIG. 1. FIG. 3 is a partial plan view illustrating the light source apparatus 5 shown in FIG. 2. FIG. 4 is a partial perspective view illustrating the light source apparatus 5 shown in FIG. 2 for illustrating drawn-out power wires.

Referring to FIGS. 2 to 4, the light source apparatus 5 includes a light guide plate (LGP) 10, a light source 21, and a power supply unit 25. In an example embodiment, the LGP 10, the light source 21 and the power supply unit 25 are integrally assembled.

The LGP 10 diffuses the light emitted from the light source 21 and provides surface guided light having improved luminance uniformity. The LGP 10 may be formed by an injection molding process using polymer resin which has low thermal conductivity, high chemical resistance, and high mechanical strength. Examples of the polymer resin may, for example, include polymethyl methacrylate, polyamide, polyimide, polypropylene, polyurethane, etc.

The LGP 10 may be a 1 mm thick plate. The LGP 10 may include a lower surface 13 facing the bottom plate 32, an upper surface 11 facing the lower surface 13, a first side surface 12, a second side surface 14, a third side surface 16 and a fourth side surface 18 contacting the first sidewall 31, a second sidewall 33, a third sidewall 35 and a fourth sidewall 37, respectively.

Light diffusion holes 15 and 17 may be formed through peripheral areas of the upper surface 11 adjacent to the first and second sidewalls 31 and 33, respectively, to be substantially parallel with the first sidewall 31 as shown in FIGS. 1 and 2. The light diffusion holes 15 and 17 may be formed through the LGP 10 from the upper surface 11 to the lower surface 13. Thus, each of the light diffusion holes 15 and 17 has a first hole surface and a second hole surface that forms the inner sidewalls of the light diffusion holes 15, 17. The first and second hole surfaces are spaced apart from each other. The first hole surface is closer to the first side surface 12 than the second hole surface.

Figure 5:
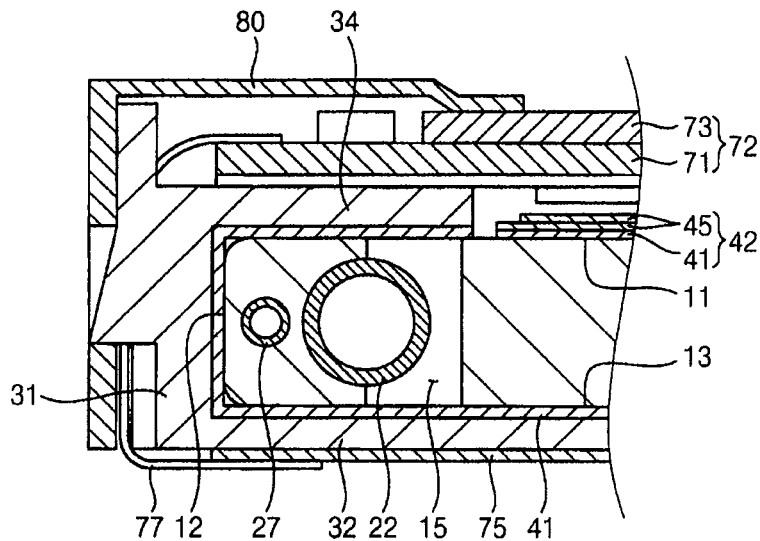
FIG. 5 is a cross-sectional view illustrating the display apparatus taken along a line I-I' in FIG. 1.

FIG. 5 is a cross-sectional view illustrating the display apparatus 3 taken along a line I-I' in FIG. 1.

Referring to FIGS. 2, 3 and 5, the light source 21 may be a cold cathode fluorescent lamp (CCFL). Thus, the reference number of the light source 21 is used for the lamp 21. The lamp 21 may include a lamp tube 22, a first electrode 23 and a second electrode 24. The lamp tube 22 may have a linear tube shape. The lamp tube 22 may be formed of glass or plastic. Discharge gas is filled in the inner space of the lamp tube 22. The first and the second electrodes 23 and 24 may be placed at a first end and a second end of the lamp tube 22, respectively.

In an example embodiment, the light source apparatus 5 includes a plurality of the lamps 21. The lamps 21 are placed in the LGP adjacent to the first side surface 12 and the second side surface 14, respectively, Thus, the lamp 21 adjacent to the first side surface 12 is representatively illustrated.

The lamp 21 is placed parallel with the first side surface 12 in the LGP 10, by having the lamp 21 placed in an LGP 10 mold frame during injection molding process. An outer surface of the lamp 21 may be partially exposed through the first hole surface. Thus, a portion of the outer surface of the lamp 21 faces the second hole surface. Thus, some of the light emitted from the outer surface of the lamp 21 is incident on the second hole surface through air. Light incident on the second hole surface through air is better collimated for diffusion than light traveling directly through the LGP 10.

According to an example embodiment, the lamp 21 is placed in the LGP 10. Thus, additional elements such as a reflector and a holder which are used in fixing the lamp 21 may be omitted. Thus, the number of parts included in the backlight assembly 100 is decreased.

According to an example embodiment, the LGP 10 is fixed in resin in order to prevent damage to the lamp 21. While a back cover may be placed on a rear face of the bottom plate 32 of the container 30 in a conventional backlight assembly for protecting the lamp 21, lamp 21 is protected by fixing in the LGP 10, and thus the back cover may be omitted.

A plurality of the power supply units 25 may be electrically connected to the lamps 21, respectively, and provide the lamp 21 with driving power. A portion of the power supply unit 25 is placed in the LGP 10 and the rest of the power supply unit 25 is drawn out from the LGP 10. The power supply unit 25 may include a first wire 26, a second wire 27 and a connector 28.

The first wire 26 is electrically connected to the first electrode 23, for example, a hot electrode to which high voltage may be applied. The second wire 27 is electrically connected to the second electrode 24, for example, a ground electrode which is grounded.

The second wire 27 may extend between the first side surface 12 and the lamp 21 in the LGP as shown in FIGS. 4 and 5. The first and the second wires 26 and 27 may be drawn out through the third side surface 16 facing the first electrode 23 as shown in FIGS. 3 and 4. The connector 28 may be connected to end portions of the first and the second wires 26 and 27 drawn out from the LGP 10.

In an example embodiment, a portion of the second wire 27 is placed in the LGP 10 and insulated by the resin. Thus, additional guide recesses for aligning the second wire 27 may be omitted.

When the light source apparatus 5 is placed in the container 30, the first side surface 12 of LGP 10 may be inserted between the bottom plate 32 and the light source guide portion 34, and then the LGP 10 is slightly bent to insert in the container 30. The backlight assembly 100 may further include a reflective sheet 41 and an optical sheet 42.

The reflective sheet 41 is placed between the bottom plate 32 and the LGP 10. The reflective sheet 41 extends between the first sidewall 31 and the first side surface 12, and between the light source guide portion 34 and the upper surface 11 of the LGP 10. The reflective sheet 41 reflects the light that leaks from the LGP 10 toward the LCD panel 70.

The optical sheet 42 may include a diffusion sheet 43 and two light condensing sheets 45 which are successively placed on the upper surface 11. The diffusion sheet 43 may improve the luminance uniformity of light emitted from the upper surface 11. The condensing sheets 45 may improve the vertical luminance intensity emitted from the diffusion sheet 43.

Figure 6:
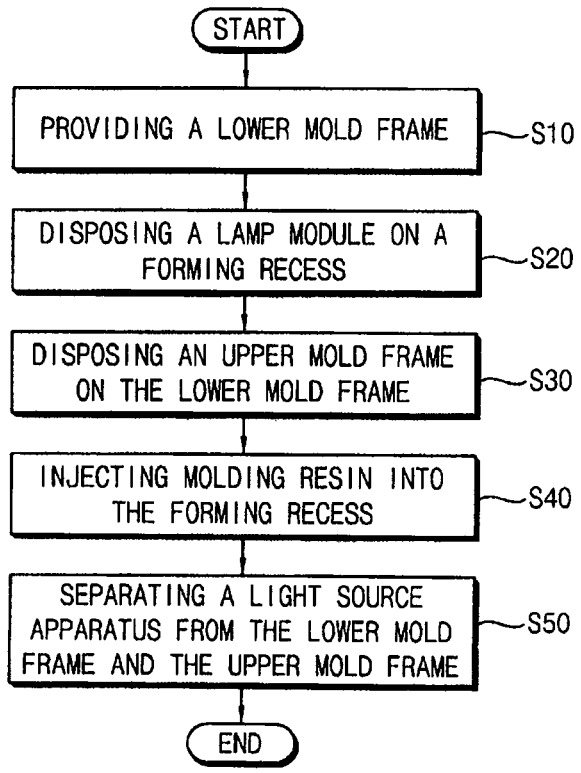
FIG. 6 is a flowchart illustrating a method of manufacturing the light source described in FIGS. 1 to 5.

FIG. 6 is a flowchart illustrating a method of manufacturing the light source 21 described in FIGS. 1 to 5. FIGS. 7 to 10 are process views illustrating the method of manufacturing the light source 21 illustrated in FIG. 6.

Referring to FIG. 6, in a method of manufacturing the light source apparatus 5, injection molding is used for forming the light source apparatus 5.

Figure 7:
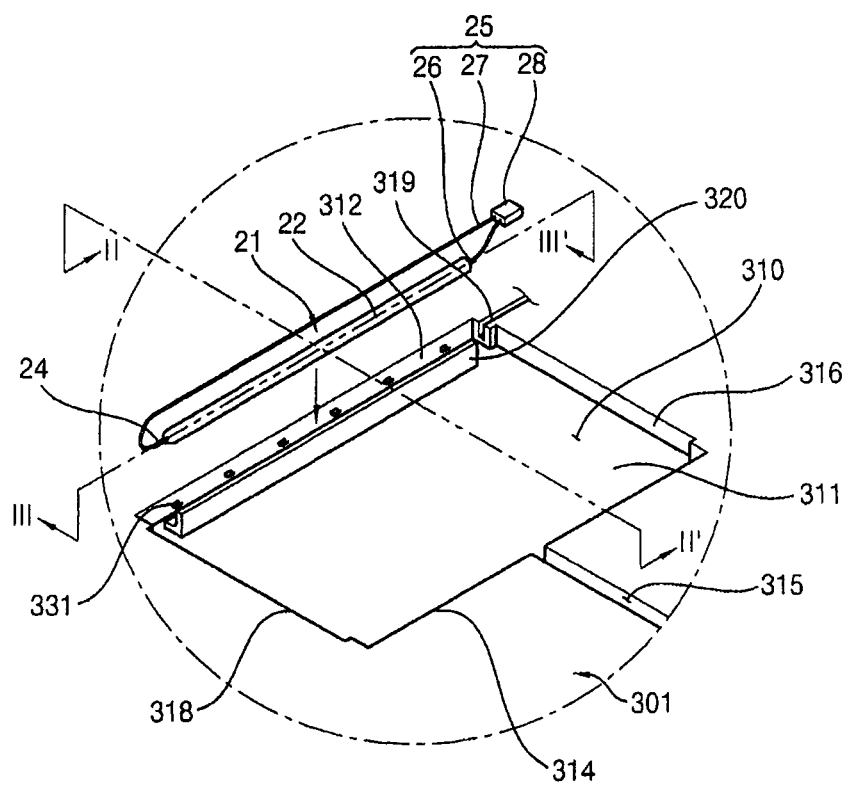
FIGS. 7 to 10 are process views illustrating the method of manufacturing the light source illustrated in FIG. 6.

FIG. 7 is a perspective view illustrating a lower mold frame 301 for forming the light source apparatus 5 illustrated in FIGS. 1 to 5.

A lower mold frame 301 for doing a forming recess 310 is provided as shown in FIG. 7 (step S10). The forming recess 310 will hold LGP 10 and includes first, second, third and fourth recess side surfaces 312, 314, 316 and 318 corresponding to the first, the second, the third and the fourth side surfaces 12, 14, 16 and 18 of the LGP 10. A first fixing bar 320 is formed on a bottom surface 311 of the forming recess 310 and faces the first recess side surface 312 of the forming recess 310. The first fixing bar 320 includes a first curved surface surrounding a portion of the outer surface of the lamp 21.

Drawing-out holes 319 for drawing out the first and second wires 26 and 27 may be formed through a third recess side surface 316 corresponding to the third side surface 16 of the LGP 10. Injection holes 315 through which molding resin is injected into the forming recess 310 may be formed through a fourth recess side surface 318 corresponding to the fourth side surface 18 of the LGP 10.

First support protrusions 331 for fixing the second wire 27 may be formed on the first recess side surface 312. The first support protrusions 331 may be formed of the molding resin and may be included in the LGP 10 during the injection molding process.

The lamp 21 and the power supply unit 25 are assembled into a lamp module 20. The lamp module 20 is placed on the forming recess 310 to face the first recess side surface 312 (step S20). The lamp 21 is placed on the first curved surface of the first fixing bar 320 to be parallel with the first recess face.

Figure 8A:
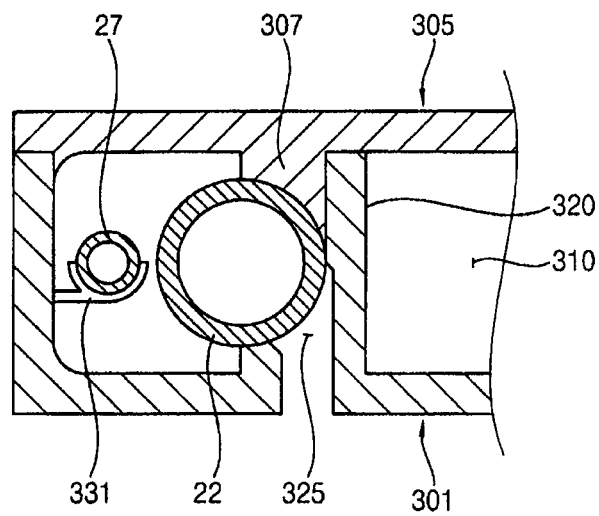
Figure 8B:
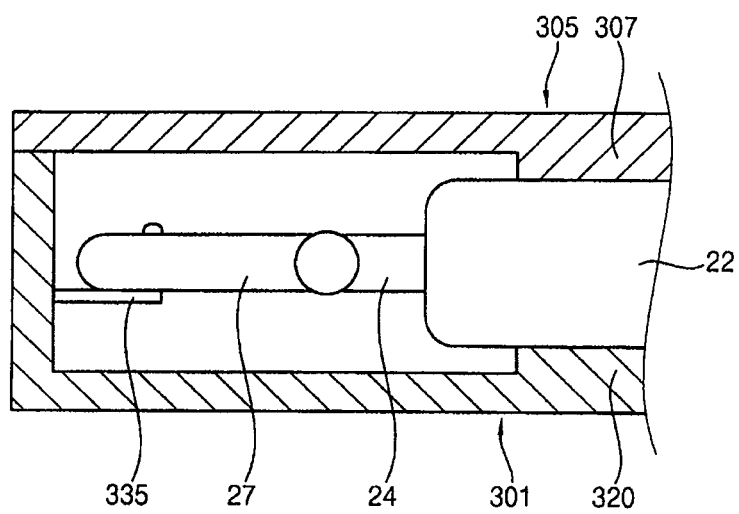

FIG. 8A is a cross-sectional view illustrating an assembly of the lower mold frame 301 shown in FIG. 7 and an upper mold frame 305 taken along a line II-II'. FIG. 8B is a cross-sectional view illustrating an assembly of the lower mold frame 301 shown in FIG. 7 and an upper mold frame 305 taken along a line III-III'.

Referring to FIGS. 8A and 8B, the second wire 27 is supported by the first support protrusions 331 formed on the first recess side surface 312 and second support protrusions 335 formed on the fourth recess side surface 318. Suction holes 325 may be formed through the first curved surface of the first fixing bar 320. The lamp 21 may be held on the first curved surface by vacuum suction.

An upper mold frame 305 is placed on the lower mold frame 301 (step S30). A second fixing bar 307 is formed on the upper mold frame 305 corresponding to the first fixing bar 320. The second fixing bar 307 includes a second curved surface surrounding a portion of the outer surface of the lamp 21. When a portion of the second fixing bar 307 is inserted between the first fixing bar 320 and the outer surface of the lamp 21, the second curved surface makes contact with the outer surface of the lamp 21.

The light diffusion hole 17 or 15 is formed through the LGP 10 due to the first and the second fixing bars 320 and 307. The light diffusion hole 17 or 15 exposes a portion of the outer surface of the lamp 21 facing the second side surface 14.

Figure 9:
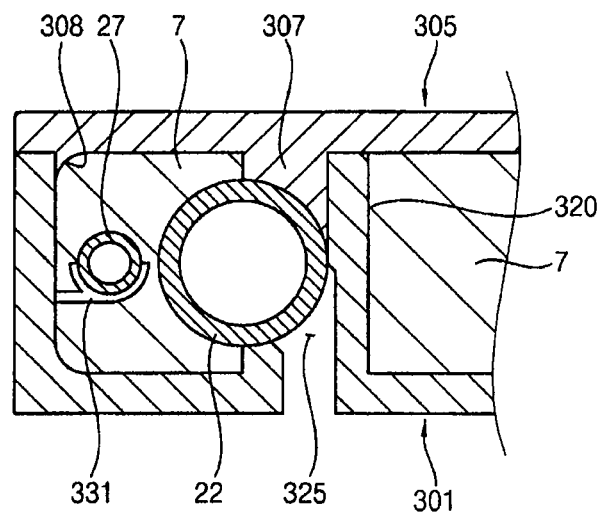
Figure 10:
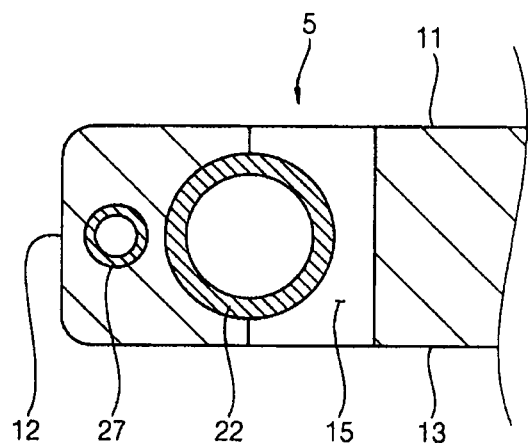

The molding resin 7 is injected into the forming recess 310 through the injection hole (step S40). The molding resin 7 is filled in the forming recess 310 as shown in FIG. 9. The molding resin 7 surrounds the lamp 21 except for the portion covered by the first and the second fixing bars 320 and 307. The molding resin 7 may not damage the lamp 21 because the temperature of the molding resin 7 may be much lower than the melting temperature of the lamp 21.

The light source apparatus 5 is separated from the lower mold frame 301 and the upper mold frame 305 (step S50). The molding resin 7 filled in the forming recess 310 is cooled down. The LGP 10 is formed according to the forming recess 310. The lamp 21 is fixed in the LGP 10. The first and the second wires 26 and 27 are drawn out from the LGP 10. The LGP 10, the lamp 21, and the first and the second wires 26 and 27 are assembled into the light source apparatus 5. Unnecessary or rough portions of the LGP 10 outside of the lower and upper mold frames 301 and 305 may be trimmed. As a result, the light source apparatus 5 is manufactured.

Figure 11:
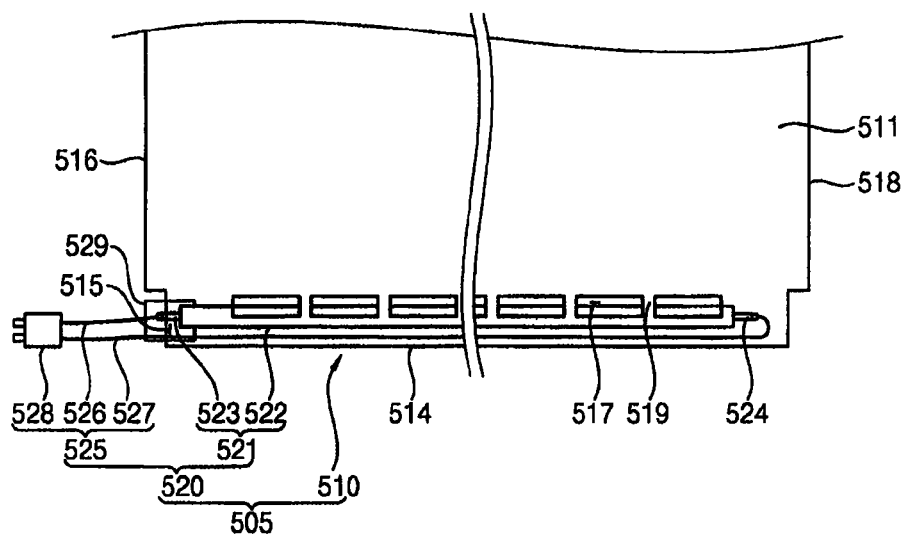
FIG. 11 is a partial plan view illustrating a light source apparatus in accordance with another example embodiment of the present invention.
Figure 12:
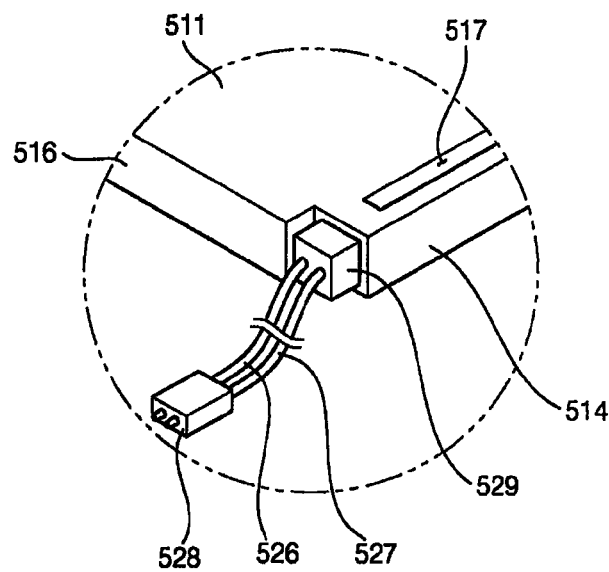
FIG. 12 is a partial perspective view illustrating the light source apparatus shown in FIG. 11 for illustrating drawn-out power wires.

FIG. 11 is a partial plan view illustrating a light source apparatus 505 in accordance with another example embodiment of the present invention. FIG. 12 is a partial perspective view illustrating the light source apparatus 505 shown in FIG. 11 for illustrating drawn-out power wires.

Referring to FIGS. 11 and 12, a light source apparatus 505 in accordance with this example embodiment is similar to the light source apparatus 5 illustrated in FIGS. 1 to 5 except for a different shape light diffusion hole 517, a holder groove 515 being further formed on an LGP 510 and further including a guide holder 529 and support portions 519. Thus, corresponding reference numbers are used for corresponding elements and repetitive descriptions are omitted.

In this example embodiment, the light diffusion holes 517 are formed from an upper surface 511 through a lower surface 513 of the LGP 510 along a first side surface of the LGP 510. A lamp 521 is partially exposed through the light diffusion holes 517. The support portions 519 are formed between the light diffusion holes 517. Thus, the light source apparatus 505 may be more rigidly held than the light source apparatus 5 is in FIGS. 1 to 5.

The holder groove 515 is formed on the third side surface 516 of the LGP 510 corresponding to a first electrode 523 of the lamp 521. A first end of the lamp 521 is exposed through the holder groove 515 and a second wire 527 is drawn out through the holder groove 515.

In this example embodiment, the light source apparatus 505 may further include the guide holder 529. The guide holder 529 is inserted into the holder groove. The first and the second wires 526 and 527 are guided by the guide holder 529 and drawn out from the LGP 510. Thus, the first and the second wires 526 and 527 are clearly arranged by the guide holder 529 and the guide holder 529 protecting the first and the second wires 526 and 527 from long-term damage.

The method of manufacturing the light source apparatus 505 in accordance with this example embodiment is similar to the method of manufacturing the light source apparatus 5 illustrated in FIGS. 6 to 10 except for further assembly of the guide holder 529 and additional mold filling of light source apparatus 505 . . . . Thus, repetitive descriptions are omitted.

A backlight assembly according to this example embodiment is similar to the backlight assembly 100 illustrated in FIGS. 1 to 5 except for the difference in the light source apparatus 505 illustrated in FIGS. 11 and 12. Thus, repetitive descriptions are omitted.

Figure 13:
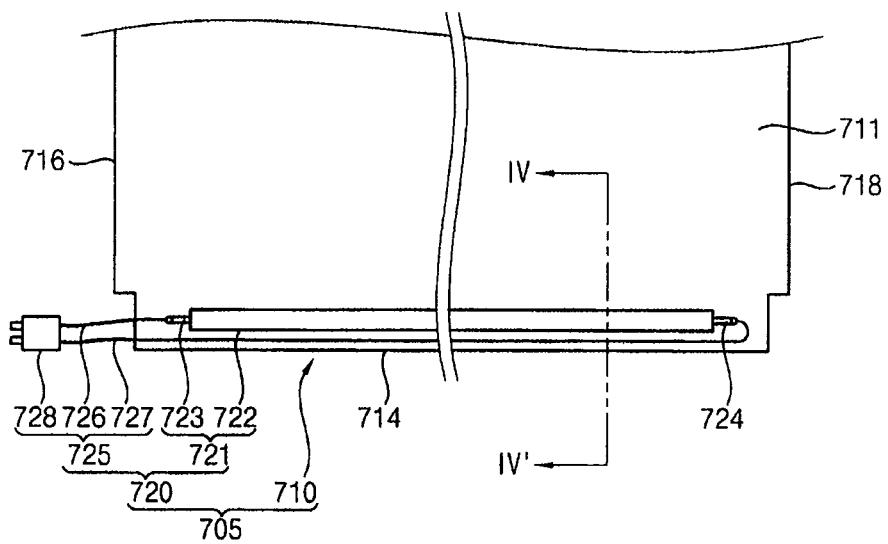
FIG. 13 is a partial plan view illustrating a light source apparatus in accordance with further another example embodiment of the present invention.
Figure 14:
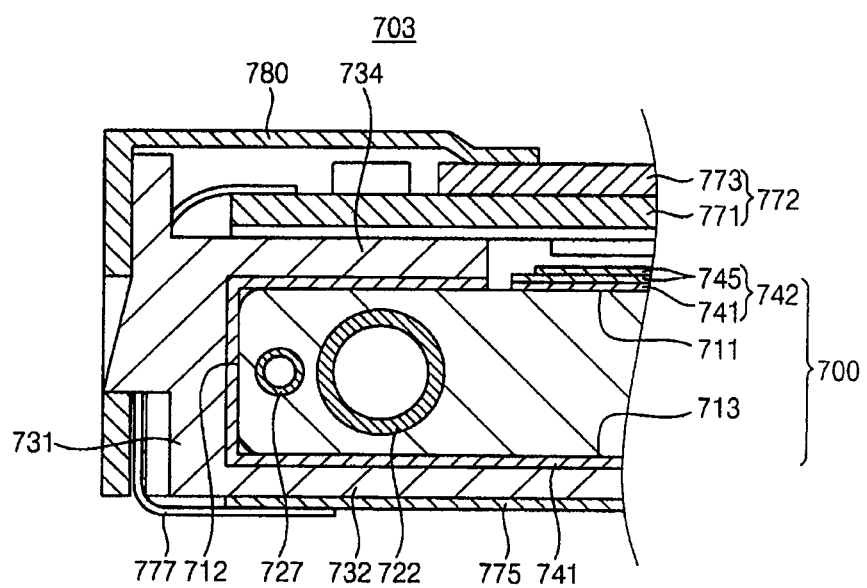
FIG. 14 is a cross-sectional view illustrating a display apparatus including the light source apparatus taken along a line IV-IV' in FIG. 13.

FIG. 13 is a partial plan view illustrating a light source apparatus 705 in accordance with another example embodiment of the present invention. FIG. 14 is a cross-sectional view illustrating a display apparatus 703 including the light source apparatus 705 taken along a line IV-IV' in FIG. 13.

Referring to FIGS. 13 and 14, a light source apparatus 705 in accordance with example embodiment is similar to the light source apparatus 5 illustrated in FIGS. 1 to 5 except that there are no light diffusion holes. Thus, corresponding reference numbers are used for corresponding elements and repetitive descriptions are omitted.

In this example embodiment, light emitted from a lamp 721 is directly transmitted through the LGP 710. Thus, external damage to the lamp 721 from a foreign substance may be prevented.

A method of manufacturing the light source apparatus 705 in accordance with this example embodiment is similar to the method of manufacturing the light source apparatus 5 illustrated in FIGS. 6 to 10 except that first and second fixing bars have been removed from lower and upper mold frames. Thus, repetitive descriptions are omitted.

A backlight assembly 700 according to this example embodiment is similar to the backlight assembly 100 illustrated in FIGS. 1 to 5 except for including the light source apparatus 705 illustrated in FIGS. 13 and 14. Thus, repetitive descriptions are omitted.

Figure 15:
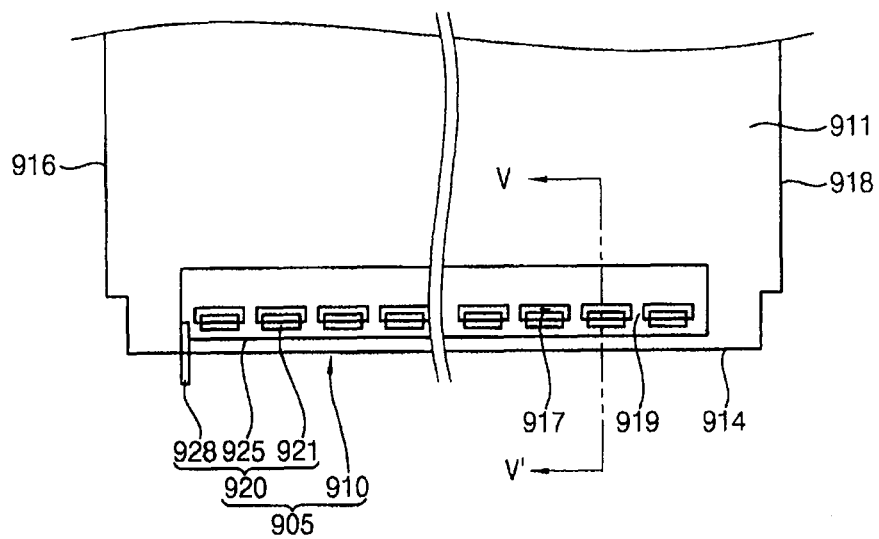
FIG. 15 is a partial plan view illustrating a light source apparatus in accordance with further still another example embodiment of the present invention.
Figure 16:
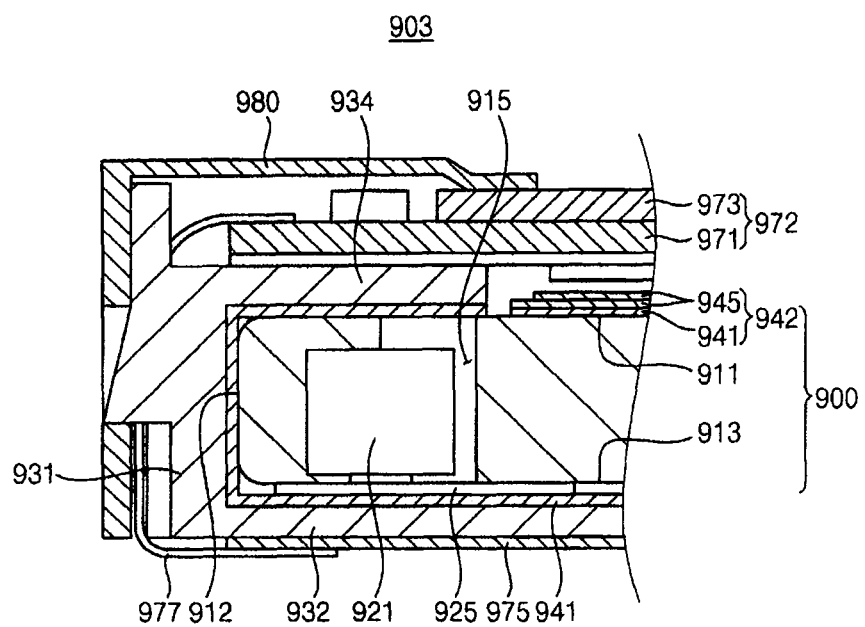
FIG. 16 is a cross-sectional view illustrating a display apparatus including the light source apparatus taken along a line V-V' in FIG. 15.

FIG. 15 is a partial plan view illustrating a light source apparatus 905 in accordance with further example embodiment of the present invention. FIG. 16 is a cross-sectional view illustrating a display apparatus 903 including the light source apparatus 905 taken along a line V-V' in FIG. 15.

Referring to FIGS. 15 and 16, a light source apparatus 905 is comprised of a plurality of light-emitting diodes (LED) 921 and a power supply substrate 925, and light diffusion holes 917 formed through the LGP 910 in a row. Thus, corresponding reference numbers are used for corresponding elements and repetitive descriptions are omitted.

In this example embodiment, the light diffusion holes 917 are formed from an upper surface 911 through a lower surface 913 of the LGP 910 and fixed in a row along a first side surface 912 of the LGP 910. A light source 921 is partially exposed through the light diffusion holes 917.

The light source 921 includes a plurality of the LEDs 921. The LEDs 921 are placed in a peripheral area of the power supply substrate 925 in a row along a first side surface 912 of the LGP 910. The LEDs 921 are placed in the LGP 910 so that a light-emitting portion of the LED 921 faces a second side surface 914 of the LGP 910.

The power supply substrate 925 is electrically connected to the LEDs 921 and placed in the LGP 910. Substrate portions of the power supply substrate 925 may be exposed through a lower surface 913 of the LGP 910. Alternatively, the power supply substrate 925 may be completely placed in the LGP 910.

Thus, the LEDs 921 are placed in the LGP 910 and the distance between each LED 921 and a second hole surface is consistent. Therefore, the uniformity of the light source apparatus 905 may be improved, illuminating the needs to fix quality issues from having a point light source.

A backlight assembly 900 according to this example embodiment is similar to the backlight assembly 100 illustrated in FIGS. 1 to 5 except for the light source apparatus 905 illustrated in FIGS. 15 and 16. Thus, repetitive descriptions are omitted.

Figure 17:
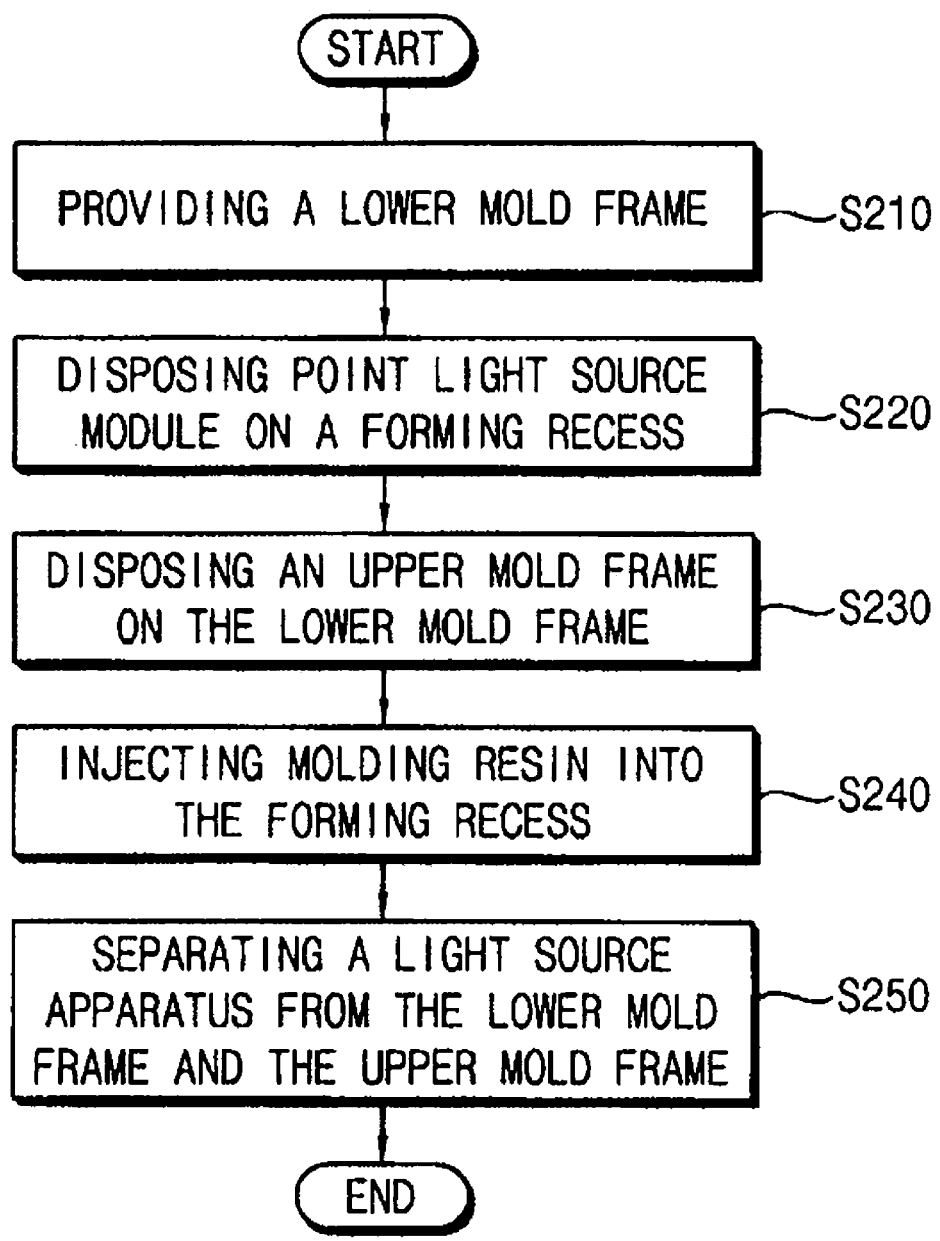
FIG. 17 is a flowchart illustrating a method of manufacturing the light source described in FIGS. 15 and 16.

FIG. 17 is a flowchart illustrating a method of manufacturing the light source 921 described in FIGS. 15 and 16. FIGS. 18 to 21 are process views illustrating the method of manufacturing the light source 921 illustrated in FIG. 17.

A method of manufacturing the light source apparatus 905 in accordance with this example embodiment is similar to the method of manufacturing the light source apparatus 5 illustrated in FIGS. 6 to 10 except that a first fixing bar has been removed from a lower mold frame 1001, a substrate groove 1020 on which the power supply substrate 925 is placed is further formed on a bottom surface 1011 of a forming recess 1010 of the lower mold frame 1001. Thus, repetitive descriptions are omitted.

Figure 18:
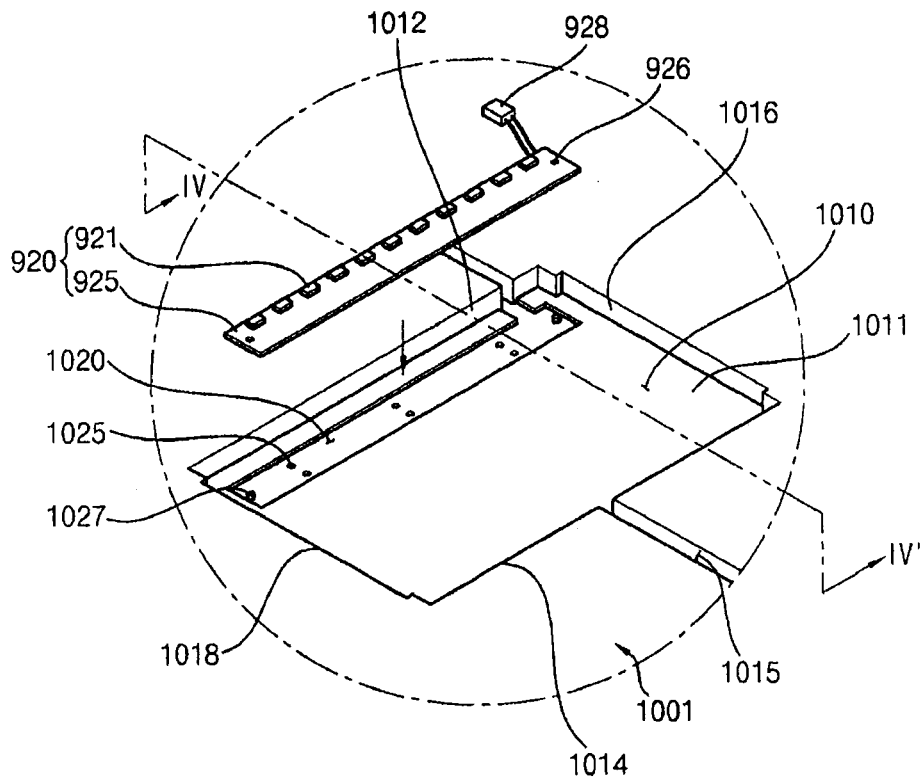
FIGS. 18 to 21 are process views illustrating the method of manufacturing the light source illustrated in FIG. 17.
Figure 19:
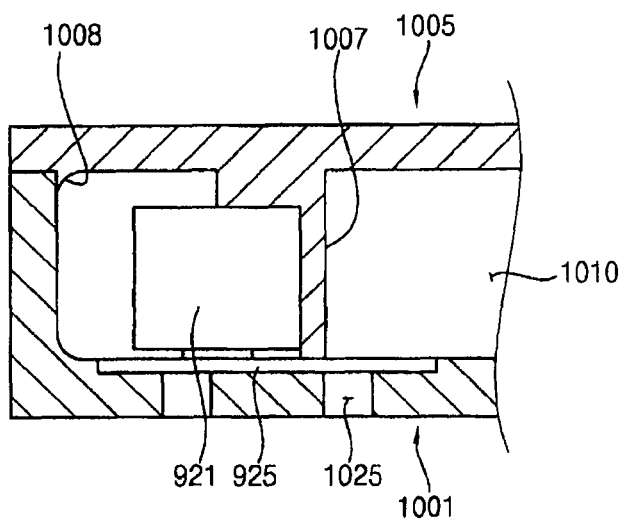

A lower mold frame 1001 on which a forming recess 1010 is formed is provided as shown in FIG. 18 (step S210). The first fixing bar has been removed from the lower mold frame 1001. The substrate groove 1020 is formed on the bottom surface 1011 of a forming recess 1010 adjacent to the first recess side surface 1012. Alignment fins 1027 are formed on the substrate groove 1020 and suction holes 1025 are formed through the substrate groove 1020.

The LEDs 921 and the power supply substrate 925 are assembled into a light source module. The light source module is placed on the substrate groove 1020 (step S220). The power supply substrate 925 may be exposed through the lower surface 913 of the LGP 910 due to the substrate groove 1020.

An upper mold frame 1005 is placed on the lower mold frame 1001 (step S230). A fixing bar is formed on the upper mold frame 1005 corresponding to the LEDs 921. The light diffusion holes 917 through which the LEDs 921 are partially exposed are formed on the LGP 910 due to the fixing bar.

Figure 20:
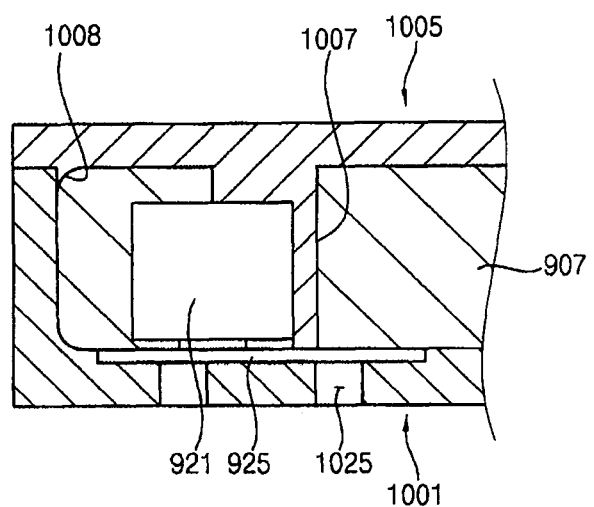

The molding resin 907 is injected into the forming recess 1010 through the injection hole (step S240) as shown in FIG. 20. The power supply substrate 925 is not touching the molding resin 907 due to the substrate groove 1020.

Figure 21:
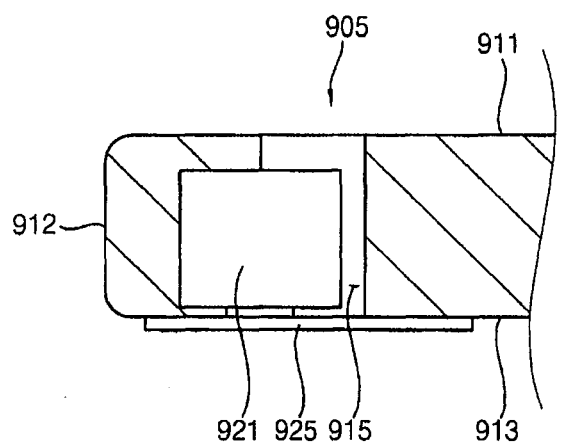

The light source apparatus 905 is separated from the lower mold frame 1001 and the upper mold frame 1005 (step S250) as shown in FIG. 21. Unnecessary or rough portions of the LGP 910 outside of the lower and upper mold frames 1001 and 1005 may be trimmed. As a result, the light source apparatus 905 is manufactured.

Figure 22:
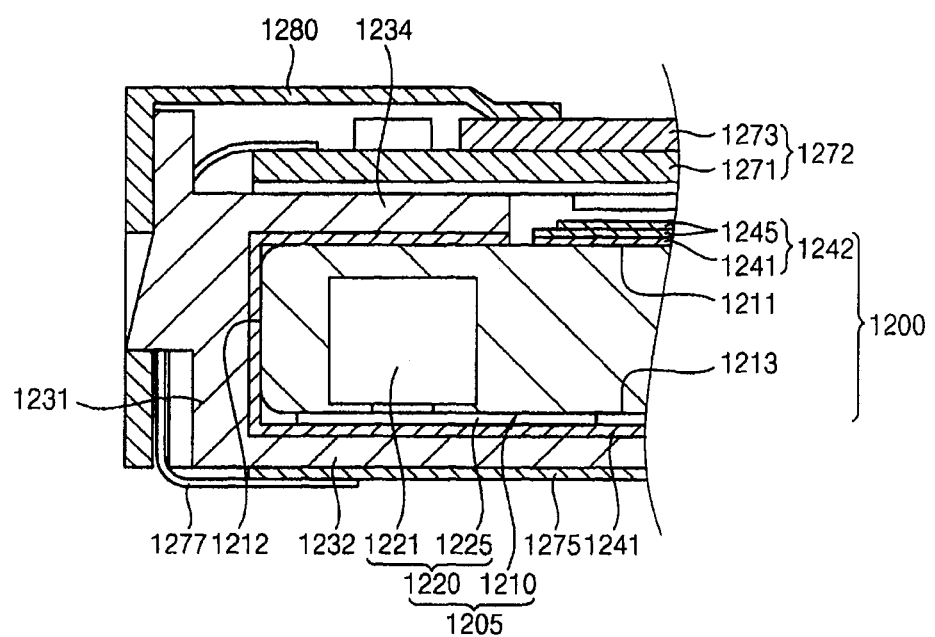
FIG. 22 is a cross-sectional view illustrating a display apparatus including a light source apparatus in accordance with further still another example embodiment of the present invention.

FIG. 22 is a cross-sectional view illustrating a display apparatus 1203 including a light source apparatus 1205 in accordance with further still another example embodiment of the present invention.

Referring to FIG. 22, a light source apparatus 1205 according to this example embodiment is similar to the light source apparatus 905 illustrated in FIGS. 15 and 16 except that light diffusion holes have been removed from the LGP 1210. Thus, corresponding reference numbers are used for corresponding elements and repetitive descriptions are omitted.

Thus, a foreign substance entering into the LGP 1210 and external damage to the LEDs 1221 may be prevented.

A method of manufacturing the light source apparatus 1205 according to an example embodiment is similar to the method of manufacturing the light source apparatus 905 illustrated in FIGS. 17 to 21 except that a first fixing bar has been removed from a lower mold frame. Thus, repetitive descriptions are omitted.

A backlight assembly 1200 according to this example embodiment is similar to the backlight assembly 900 illustrated in FIGS. 15 and 16 except for including the light source apparatus 1205 illustrated in FIG. 22. Thus, repetitive descriptions are omitted.

As the benefits of the example embodiments of the present invention, module size, the number of parts of a backlight assembly, and steps of manufacturing processes for a light source apparatus and the backlight assembly may be decreased. Also, the illumination quality of the light source apparatus may be improved and external damage to the light source may be prevented. Thus, the present invention may be used in a backlight assembly including an LGP in a flat panel display apparatus.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A light source apparatus, comprising:
a light guide plate (LGP) including an upper surface and a lower surface facing each other, and a first side surface and a second side surface facing each other, the first side surface and the second side surface being connected to the upper surface and the lower surface, respectively;
a light source placed inside the LGP and placed parallel to the first side surface, the light source emitting light toward the second side surface, the light source being partially exposed by a light diffusion hole that is formed at the LGP, the light diffusion hole including a first hole surface and a second hole surface that are substantially flat and are substantially parallel to the first side surface, the second hole surface being spaced from the light source, the first hole surface being spaced from the second hole surface with a first portion of the light source being disposed at a first side with respect to the first hole surface and with a second portion of the light source being disposed at a second side with respect to the first hole surface; and
a power supply unit electrically connected to the light source, a portion of the power supply unit being placed in the LGP.

2. The light source apparatus of claim 1, wherein the light source comprises:
a lamp tube placed in the LGP to face the first side surface;
a first electrode placed at a first end of the lamp tube; and
a second electrode placed at a second end of the lamp tube being opposite to the first end.

3. The light source apparatus of claim 2, wherein the power supply unit comprises:
a first wire electrically connected to the first electrode, the first wire being drawn out through a third side surface of the LGP, the third side surface facing the first electrode and connected to the first and the second side surfaces;
a second wire electrically connected to the second electrode, extending between the lamp tube and the first side surface and drawn out through the third side surface; and
a connector connected to end portions of the first and the second wires drawn out through the third side surface.

4. The light source apparatus of claim 3, wherein the light diffusion hole is formed through the upper surface adjacent to the first side surface along the first side surface, the lamp tube being partially exposed through the first side surface to face the second hole surface.

5. The light source apparatus of claim 3, wherein a holder groove is further formed on the third side surface, the first end of the lamp being exposed through the holder groove, the light source apparatus further comprising a guide holder inserted into the holder groove, the first and the second wires being drawn out through the guide holder.

6. The light source apparatus of claim 3, wherein the light source is a first light source and the power supply is a first power supply unit, further comprising:
a second light source placed in the LGP adjacent to the second side surface, emitting light toward the first side surface; and
a second power supply unit electrically connected to the second light source and being substantially the same as the first power supply unit.

7. The light source apparatus of claim 2, wherein the light source comprises a plurality of light-emitting diodes (LEDs).

8. The light source apparatus of claim 7, wherein the power supply unit comprises a power supply substrate on which the LEDs are placed.

9. The light source apparatus of claim 8, wherein the power supply substrate is partially exposed through the lower surface of the LGP.

10. The light source apparatus of claim 9, wherein a plurality of light diffusion holes is formed through the upper surface adjacent to the first side surface corresponding to the LEDs along the first side surface, each of the light diffusion holes including a first hole surface and a second hole surface which are substantially parallel with the first side surface, and the LEDs being partially exposed through the first side surface to face the second hole surface.

11. The light source apparatus of claim 1, wherein
the light source is disposed between the first side surface and the second side surface, and
the first side surface and the second side surface are formed of a same material.

12. The light source apparatus of claim 11, wherein the material includes polymer resin.

13. A backlight assembly, comprising:
a container including a bottom plate and sidewalls extending from the bottom plate; and
a light source apparatus, comprising:
an LGP including a lower surface facing the bottom plate, an upper surface opposite to the lower surface, a first side surface between the lower and upper surfaces and a second side surface opposite to the first side surface;
a light source being placed inside the LGP and being placed parallel to the first side surface, the light source emitting light toward the second side surface, the light source being partially exposed by a light diffusion hole that is formed at the LGP, the light diffusion hole including a first hole surface and a second hole surface that are substantially flat and are substantially parallel to the first side surface, the second hole surface being spaced from the light source, the first hole surface being spaced from the second hole surface with a first portion of the light source being disposed at a first side with respect to the first hole surface and with a second portion of the light source being disposed at a second side with respect to the first hole surface; and a power supply unit being electrically connected to the light source, a portion of the power supply unit being placed in the LGP.

14. The backlight assembly of claim 13, wherein the container further comprises a light source guide portion which extends from the sidewall facing the first side surface to face the upper surface of the light guide, the backlight assembly further comprising a reflective sheet and the reflective sheet is placed between the bottom plate and the LGP, between the sidewall and the first side surface and between the light source guide portion and the upper surface of the LGP.

15. The backlight assembly of claim 14, wherein the light source comprises a lamp and the power supply unit comprises:

a first wire electrically connected to a first electrode of the lamp, the first wire being drawn out through a third side surface of the LGP, the third side surface facing the first electrode and being connected to the first and the second side surfaces; and a second wire electrically connected to a second electrode of the lamp, extending between the lamp tube and the first side surface and being drawn out through the third side surface.

16. The backlight assembly of claim 14, wherein the light source comprises a plurality of LEDs placed in a row along the first side surface, the power supply unit comprises a power supply substrate on which the LEDs are placed and the power supply substrate is placed between the lower surface of the LGP and the reflective sheet.

17. The backlight assembly of claim 14, wherein the light diffusion hole is formed through the upper surface to face the second side surface, and the light source is partially exposed through the light diffusion hole to face the second hole surface.

18. The backlight assembly of claim 13, wherein the lower surface, the upper surface, the first side surface, and the second side surface are formed of a same material.

19. The backlight assembly of claim 13, wherein the light source is disposed between the first side surface and the second side surface, and the first side surface and the second side surface are formed of a same material.

20. The backlight assembly of claim 19, wherein the material includes polymer resin.

21. The light source apparatus of claim 1, wherein the lower surface, the upper surface, the first side surface, and the second side surface are formed of a same material.

* * * * *